US008473145B2

(12) United States Patent
Biswas et al.

(10) Patent No.: US 8,473,145 B2
(45) Date of Patent: Jun. 25, 2013

(54) CODE EVALUATOR TOOL WITH URGENCY INDICATOR

(75) Inventors: Shilpi Biswas, Avon, OH (US); Jennifer Grabowski, Hinckley, OH (US); Phillip Freshour, Richfield, OH (US); Hamid Namaky, South Russell, OH (US); Robyn Merchant, Richmond Heights, OH (US)

(73) Assignee: Service Solutions U.S. LLC, Warren, MI (US)

( * ) Notice: Subject to any disclaimer, the term of this patent is extended or adjusted under 35 U.S.C. 154(b) by 1016 days.

(21) Appl. No.: 12/180,245

(22) Filed: Jul. 25, 2008

(65) Prior Publication Data

US 2009/0055045 A1 Feb. 26, 2009

Related U.S. Application Data

(60) Provisional application No. 60/935,103, filed on Jul. 26, 2007.

(51) Int. Cl.

| | |
|---|---|
| ***G06F 19/00*** | (2011.01) |
| ***G06F 11/32*** | (2006.01) |
| ***G01M 17/00*** | (2006.01) |
| ***G01M 15/02*** | (2006.01) |
| ***G08B 21/18*** | (2006.01) |

(52) U.S. Cl.

USPC ....... 701/29.1; 701/31.6; 701/33.2; 701/33.8; 340/438

(58) Field of Classification Search

USPC .................. 701/1, 29, 30, 33–35, 29.1, 29.4, 701/29.5, 29.7, 29.9, 31.4, 31.6, 31.7, 31.8, 701/31.9, 32.1, 32.7; 340/425.5, 438, 439

See application file for complete search history.

(56) References Cited

U.S. PATENT DOCUMENTS

2007/0073459 A1 * 3/2007 Webster et al. ................. 701/29
2009/0006476 A1 * 1/2009 Andreasen et al. ........ 707/104.1
2009/0125178 A1 * 5/2009 Wilson ............................ 701/33

* cited by examiner

*Primary Examiner* — Thomas Tarcza
*Assistant Examiner* — Edward Pipala
(74) *Attorney, Agent, or Firm* — Baker & Hostetler LLP

(57) ABSTRACT

A diagnostic tool and method are provided wherein the diagnostic tool includes indicators to indicate the condition of the vehicle using a database and the DTCs present in the vehicle. The tool indicates for each DTC retrieved from the vehicle, the level of repair urgency. The tool also can indicate if the vehicle can be driven without damaging the vehicle.

20 Claims, 3 Drawing Sheets

CODE EVALUATOR TOOL WITH URGENCY INDICATOR

CROSS-REFERENCE TO RELATED APPLICATIONS

This application claims priority to U.S. Provisional Patent Application Ser. No. 60/935,103, filed Jul. 26, 2007, titled "CODE EVALUATOR TOOL WITH URGENCY INDICATOR," filed herewith, the disclosures of each which are hereby incorporated by reference in their entirety.

FIELD OF THE INVENTION

The present invention relates generally to an automotive diagnostic tool. More particularly, the present invention relates to a diagnostic tool with urgency indicators.

BACKGROUND OF THE INVENTION

Recently manufactured vehicles are equipped with a special system called On-Board Diagnostic II (OBD II). OBD II monitors all engine and drive train sensors and actuators for shorts, open circuits, lazy sensors and out-of-range values as well as values that do not logically fit with other power train data. Thus, OBD II keeps track of all of the components responsible for emissions and when one of them malfunctions, it signals the vehicle owner by illuminating a Maintenance Indicator Lamp (MEL), such as a check engine indicator. It also stores Diagnostic Trouble Codes (DTCs) designed to help a technician find and repair the emission related problem. OBD It also specifies the means for communicating diagnostic information to equipment used in diagnosing, repairing and testing the vehicle.

An illuminated MIL means that the OBD II system has detected a problem that may cause increased emissions. A blinking MIL indicates a severe engine misfire that can damage the catalytic converter. The MEL is reserved for emission control and monitored systems and may not be used for any other purpose. The "Check Engine," "Service Engine Soon" or other "engine symbol" message is typically used as an MEL indicator.

Although the MEL is helpful to a driver in that it lets the driver know that there is an issue with the vehicle, the driver, however, may not know if the problem is serious or not. Accordingly, it is desirable to provide a method and apparatus that provides recommendations to the driver regarding the stored code (DTC).

SUMMARY OF THE INVENTION

The foregoing needs are met, to a great extent, by the present invention, wherein in one aspect an apparatus is provided that in some embodiments allows a diagnostic tool to indicate the status of the vehicle based on DTCs and recommend a course of action.

In one embodiment, a diagnostic tool for diagnosing a vehicle is provided and includes a processor that can process a diagnostic data from the vehicle, a memory that can store a database that is used to indicate a condition of the vehicle, a connector interface that can connect the diagnostic tool to a data link connector in the vehicle, wherein the connector interface can connect removably at a first end to the data link connector and can connect non-removably at a second end to the diagnostic tool, a user interface that can allow a user to interact with the diagnostic tool, a signal translator that can allow the diagnostic tool to communicate with the vehicle in at least one communication protocol, a display that can display an indicator that indicates a level of urgency related to the condition of the vehicle based on a stored diagnostic trouble code (DTC); and a housing surrounding the processor, the memory, the connector interface, the user interface, the signal translator, and the display.

In another embodiment of the invention, a method of indicating an urgency repair level of a vehicle is provided and includes connecting a diagnostic tool to a data link connector in the vehicle, wherein the diagnostic tool includes an indicator that indicates a level of urgency related to a condition of the vehicle based on a stored diagnostic trouble code (DTC), powering on the vehicle in order to retrieve diagnostic trouble code (DTC), retrieving the DTC stored in a vehicle diagnostic computer, displaying on a display a summary of the DTC retrieved, and indicating with an indicator the level of urgency of repairs for each DTC retrieved.

In still another embodiment, a diagnostic tool for diagnosing a vehicle is provided and can include a means for processing configured to process a diagnostic data from the vehicle, a memory means configured to store a database that is used to indicate a condition of the vehicle, a means for connecting configured to connect the diagnostic tool to a data link connector in the vehicle, wherein the means for connecting connects removably at a first end to the data link connector and connects non-removably at a second end to the diagnostic tool, a means for interfacing configured to allow a user to interact with the diagnostic tool, a means for translating configured to that allow the diagnostic tool to communicate with the vehicle in at least one communication protocol, a means for displaying configured to display an indicator that indicates a level of urgency related to a condition of the vehicle based on a stored diagnostic trouble code (DTC), and a means for housing surrounding the means for processing, the memory means, the means for connecting, the means for interfacing, the means for translating, and the means for displaying.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
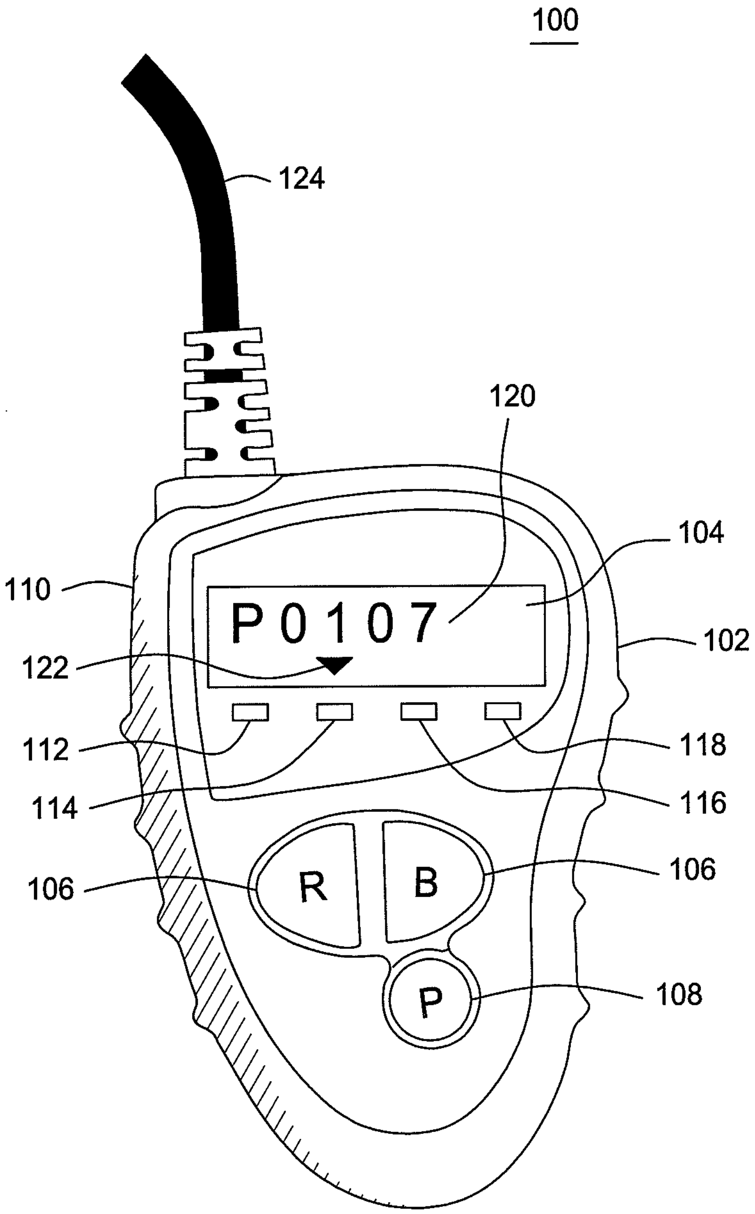
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus, such as a scan tool and method that indicate and recommend a course of action when the MEL light is illuminated in the vehicle.

An embodiment of the present inventive apparatus is illustrated in FIG. 1. In particular, FIG. 1 is a front view illustrating a diagnostic tool 100 according to an embodiment of the invention. The diagnostic tool 100 can be any computing device such as a scan tool or code reader, which is capable of communicating with a vehicle's data link connector (DLC). The DLC allows the diagnostic tool 100 to communicate with the vehicle's various diagnostic systems including OBDII. The diagnostic tool 100 includes a housing 102 to house the various components of the diagnostic tool, such as a display 104, a user interface 106, a power key 108, a universal serial bus (USB) 110, a connector interface 124 and an optional card reader (not shown). The housing includes protrusions along the side for better gripping by the user. The protrusions can be made from an elastomeric material in order to provide a comfortable gripping surface for a user.

The display 104 can be any display, for example, a liquid crystal display (LCD), a video graphics array (VGA), a touch display (which can also be a user interface), etc. The display is capable of displaying words and indicators (triangle as shown) to indicate and recommend an action based on the stored code in the OBDII. The words may include "OK," which may mean that it's OK to continue driving or "Attention," which may mean repairs may be needed within a few days (five day maximum). The words may also include "Caution," which may mean get to a repair shop, for example, within two days to avoid further damage to the vehicle or "Urgent," which may mean immediate repair is required to prevent further damage. The indicators also indicate to the user if the vehicle is drivable without potential damage to the vehicle.

The indicators can provide similar information as the words. For example, the arrow indicator 122 can be displayed to point to a color indicator (112-118) under the display. The color may be "Green," 112 which may mean that it's OK to continue driving or "Yellow," 114 which may mean repairs maybe needed within a few days (five day maximum). Other colors can include "Orange," 116 which may mean get to a repair shop within two days to avoid further damage to the vehicle or "Red," 118 which may mean immediate repair is required to prevent further damage. The color indicator may be provided on a surface of the diagnostic tool 100. In other embodiments, the color indicators (112-118) may be in the form of lights indicator or LED. The lights indicators may be steadily lit or may flash to indicate the level of urgency. In another embodiment, the entire or part of the display 104 may display the indicated color. In still another embodiment, the colors indicators may be displayed on the display. Each of the DTC retrieved from the vehicle will have its own indicator. By having each DTC matched to an indicator, more accurate information can be known then simply summarizing the DTCs and indicating only one color as to a condition of the vehicle.

The indicators can also be via sound ranging from low to high depending on the indication needed or by vibrations (slow to fast). The indicators described herein can all be used or only some be used. For example, only "Red" and "Yellow" can be used. Other combinations are also possible including both sound and colors, both words and vibration and other combinations. Additionally in other embodiments, numbers may be used such as 1-4 (1 being OK and 4 being urgent or vice versa). It should be noted that the words, numbers or indicators are recommended actions but that the user should have the vehicle checked out by a qualified technician as soon as possible after the MEL light is illuminated.

The user interface 106 allows the user to interact with the diagnostic tool in order to operate the diagnostic tool as desired. The user interface 106 can include function keys, arrow keys or any other type of keys that can manipulate the diagnostic tool 100 in order to operate various menus that are presented on the display. For example, the user interface can include an "R" button in order to read any stored code in the OBDII and a "B" button to go back to a previous screen. Additionally, the "R" button may also act as a scroll function to scroll down when, for example, held down during use or pressed again and the "B" button to scroll up when held down during use or pressed again. In the scroll function, the next or previous code may be displayed including the respective color indicators. The buttons, however, can be programmed for any functions desired by the user including an erase code or reset MIL function. The user interface 106 can include an input device such as a mouse or any other suitable input device, including a keypad, or a scanner. The user interface 106 can also include numbers or be alphanumeric. The power key 108 allows the user to turn the diagnostic tool 100 on and off, as required.

The USB connections allows the diagnostic tool 100 to communicate with other devices including another computing device such as a desktop or laptop computer. This will allow the diagnostic tool to be updated as needed including any software or database updates. Alternatively, the tool can be updated wirelessly or via the optional card reader. The DTC obtained from the vehicle may also be downloaded to another computing device for additional diagnosis.

The connector interface 124 allows the diagnostic tool 100 to connect at a first end to an external device, such as an ECU of a vehicle via the DLC. The second end is connected to the diagnostic tool. The second end may be removable in one embodiment and in another embodiment is not removable. The DLC can provide power to the diagnostic tool via one of the pins when connected to the vehicle. Thus, the diagnostic tool can be powered by the vehicle's battery or by its own power source (such as internal batteries or connected to an A/C plug).

Figure 2:
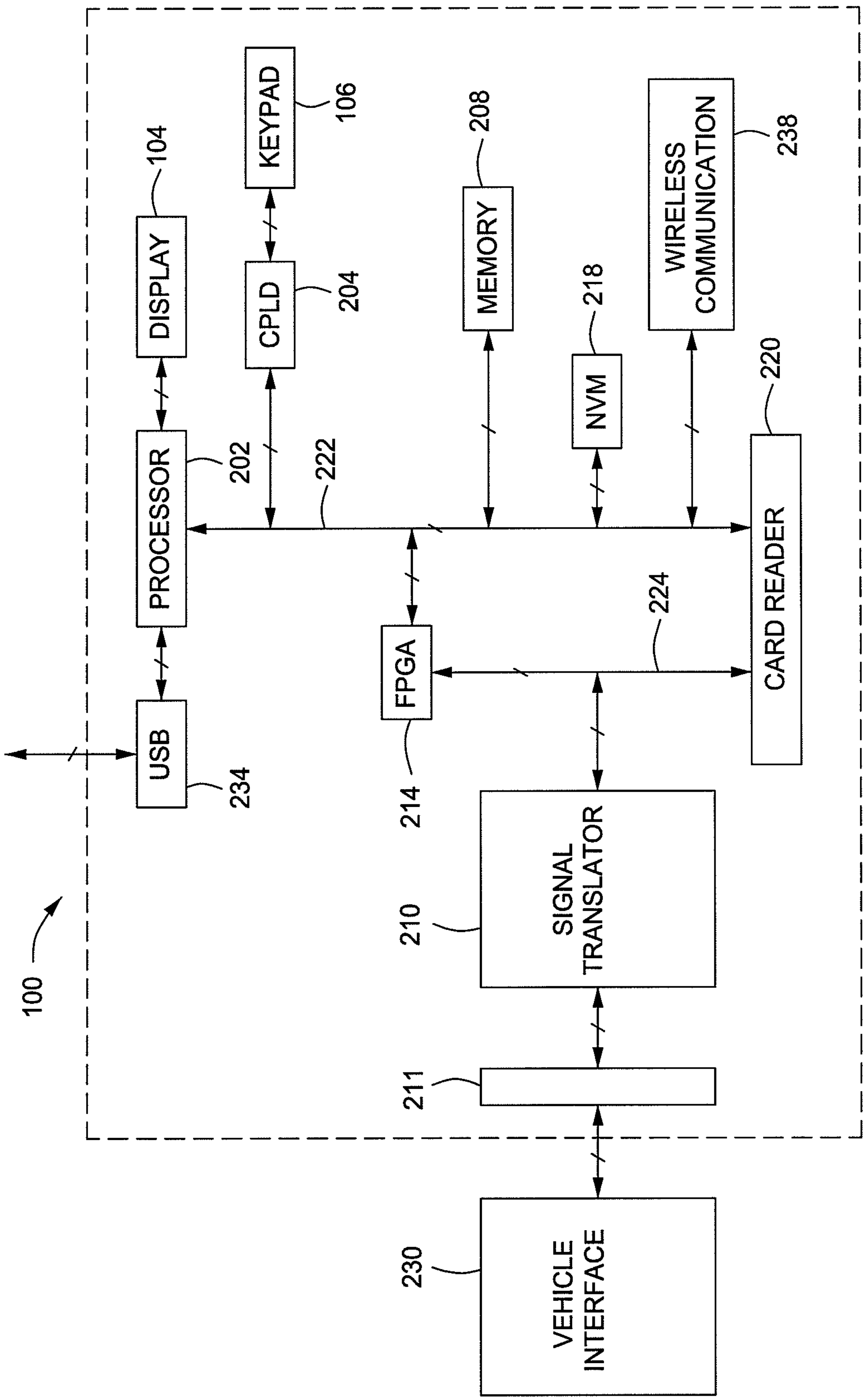
FIG. 2 is a block diagram of the components of a diagnostic tool according to an embodiment of the invention.

FIG. 2 is a block diagram of the components of the diagnostic tool 100. In FIG. 2, the diagnostic tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory (NVM) 218, a card reader 220 (optional), a second system bus 222, a connector interface 211, a selectable signal translator 210, a USB connector 234, and wireless communication circuit 238 (optional). A vehicle communication interface 230 is in communication with the diagnostic tool 100 through connector interface 211 (124 in FIG. 1) via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to connect diagnostic tool 100 to vehicle communication interface 230. Signal translator 210 is also coupled to FPGA 214 and the cardreader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The database (discussed below) can include data for use with the indicators (discussed above). The database can also be stored on an external memory, such as a compact flash card or other memories in the optional card reader.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

Wireless communication circuit 238 communicates with the processor via second bus system 222. The wireless communication circuit can be configured to communicate to RF (radio frequency), satellites, cellular phones (analog or digital), Bluetooth®V, Wi-Fi, Infrared, Zigby, Local Area Networks (LAN), WLAN (Wireless Local Area Network), or other wireless communication configurations and standards. The wireless communication circuit allows the diagnostic tool to communicate with other devices wirelessly. The wireless communication circuit includes an antenna built therein and being housed within the housing or can be externally located on the housing.

The information in the database that is used with the indicators can be pooled from various sources including SAE J2012. This document is intended to define standardized Diagnostic Trouble Codes (DTCs) that On-Board Diagnostic (OBD) systems in vehicles are required to report when malfunctions are detected and includes DTC format and a standardized set of DTCs and descriptions. General guidelines are offered for code number assignments, but no definitions are provided.

Typically, the DTC will be assigned by the manufacturer to be associated with a vehicle fault and then is linked to a definition. The definition may include some or all of the following information: (1) conditions for running the monitor that stores the DTC (enabling criteria); (2) conditions for setting the DTC in memory (code set criteria); (3) actions taken (fail safe or substitution values); and (4) code priority (MEL and DTC as opposed to DTC only with no MIL). Usually, no DTC assigned by a manufacturer to a vehicle fault is purely generic.

It should be noted that DTCs come with some limitations. For example, some vehicle problems will not store a DTC, such as a component that is binding mechanically, but passes the electrical test may not store a code. Some DTC-related faults are asymptomatic such as a gutted catalyst that may have no effect on driveability or an evaporative emission system fault that illuminates the MEL may allow hydrocarbons to escape into the atmosphere, but has no readily noticeable symptoms. DTC numbers and their descriptors can be wrong such as a transmission DTC may be stored if a critical sensor input to the TCM is missing. DTC may not properly identify the extent of the problem, for example, a short in a shared reference voltage circuit may affect multiple sensors even though only one fault is identified by DTC. A vehicle with multiple faults may not store multiple codes so that the existence of additionally faults will not be detected until the original fault is corrected and the DTC is erased. Multiple vehicle faults may be detected and multiple DTCs stored for a problem that is not properly identified by the onboard monitors or described by a DTC, such as when a voltage drop in a common ground connection can disrupt multiple circuits. These are but examples of limitations that exist in using the DTCs.

Additional resources include aftermarket repair databases, aftermarket code reference books, trade journal articles, vehicle repair manuals, white papers, presentations, aftermarket and OEM websites, aftermarket and OEM technical trainers, and practical experience from working technicians. The data and code used for the database can compiled based on experiences and the documents described herein.

Examples of the database include:

| Code/ DTC | DTC Description | DTC Alert Level | Component Most Likely to be Involved or Affected | Possible Symptoms | Causes |
|---|---|---|---|---|---|
| P0004 | Fuel Volume Regulator Control Circuit High | 1 | Wiring/short to B+/regulator/ control solenoid | Decreased engine performance and fuel economy-increased tailpipe emissions, possible no-start | High voltage in regulator or circuit, possible open ground or short to voltage |
| P0016 | Crankshift Position-Camshaft Position Correlation Bank 1 Sensor A | 1 | Wiring/CKP/CMP sensors or mechanical problem | Decreased engine performance and fuel economy-increased tailpipe emissions | CMP/CKP (camshaft/ crankshaft) timing, CMP/CKP sensor problem or wiring, PCM |
| P0261 | Cylinder 1 Injector Circuit Low | 2 | Injection/short to ground/PCM | Decreased engine performance and fuel economy-increased tailpipe emissions-rough running-misfire | Injector or circuit/PCM short to ground |
| P0276 | Cylinder 6 Injector Circuit Low | 2 | Injection/short to ground/PCM | Decreased engine performance and fuel economy-increased tailpipe emissions-rough running-misfire | Injector or circuit/PCM short to ground |
| P250F | Engine Oil Level Too Low | 3 | Low oil-mechanical problem-oil pressure switch-PCM | Engine damage from low oil pressure | Low oil-mechanical problem-oil pressure switch-PCM |
| P2672 | Injection Pump Timing Offset | 3 | Injection Pump or controlling module | Possible reduced or erratic engine performance-may adopt a fail-safe mode of operation | Incorrect engine pump timing offset |

The alert level can be used to appropriately assign the indicators. For example, alert level 1 may be associated with the "Yellow" indicator, alert level 2 may be associated with the "Orange" indicator and alert level 3 may be associated with the "Red" indicator. Other association between the alert level and the color indicators may be used.

Figure 3:
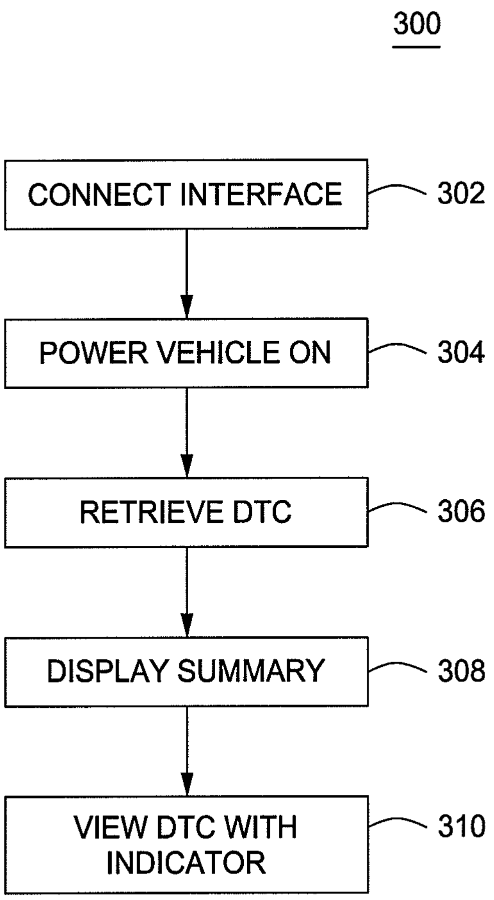
FIG. 3 illustrates a flow chart according to an embodiment of the invention.

FIG. 3 illustrates a flow chart 300 according to an embodiment of the invention. At step 302, the user connects the connector interface 124 to the vehicle's DLC. At step 304, the user turns on the vehicle, which can provide power to the tool 100. In other embodiments, the power is provided by the tool's other power source. At step 306, the tool 100 can automatically retrieve any DTCs that have been set in the vehicle. If the tool does not automatically read the DTCs from the vehicle, the user can manually press the "R" button to retrieve the DTCs. If the link fails or if there is no communication with the vehicle then a message can be displayed, such as "ERROR" or can toggle between the message "LINK" and "ERROR." At the step 308, a summary screen 308 can notify the user as to how many error codes were found or if none were found. If none were found, a message, such as "NO CODES" can appear and the arrow indicator 122 can point to the "Green" indicator. At step 310, the user can view the various retrieved DTC by pressing the "R" or "B" button as previously described. The DTC code can be shown on the display while the arrow indicator indicates the corresponding color indicator. The user can then press "R" or "B" to continue to scroll to the next code, if any. Each DTC will have its own urgency level indicator.

The many features and advantages of the invention are apparent from the detailed specification, and thus, it is intended by the appended claims to cover all such features and advantages of the invention which fall within the true spirit and scope of the invention. Further, because numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:

a processor that processes a diagnostic data from the vehicle;

a memory that stores a database that is used to indicate a condition of the vehicle, wherein the database includes a stored diagnostic trouble code (DTC) and a level of urgency corresponding to said stored DTC, which indicates a severity of the DTC, wherein the corresponding level of urgency is determined from a pool of information related to vehicle service;

a connector interface that connects the diagnostic tool to a data link connector in the vehicle, wherein the connector interface connects removably at a first end to the data link connector and connects non-removably at a second end to the diagnostic tool;

a user interface that allows a user to interact with the diagnostic tool;

a signal translator that allows the diagnostic tool to communicate with the vehicle in at least one communication protocol;

a display that displays an indicator that indicates the level of urgency corresponding to the DTC, wherein the level of urgency takes the form of multiple levels of urgency and the indicator displayed is distinct for each of the multiple levels of urgency and corresponds only with that level of urgency, and wherein the display also displays words to indicate an action based on the DTC; and a housing surrounding the processor, the memory, the connector interface, the user interface, the signal translator, and the display.

2. The diagnostic tool of claim 1, wherein the level of urgency of the condition of the vehicle informs the user when the vehicle should be serviced based on the stored DTC.

3. The diagnostic tool of claim 2, wherein the level of urgency includes three levels of urgency ranging from a low level, a middle level and a highest level of urgency as to when the user should bring his vehicle in for repairs.

4. The diagnostic tool of claim 2, wherein the level of urgency includes three levels of urgency ranging from a low level, a middle level and a highest level of urgency to indicate to the user if the vehicle can still be driven without potential damage to the vehicle.

5. The diagnostic tool of claim 1, wherein the level of urgency include three levels of urgency ranging from attention, caution and urgent repair needed.

6. The diagnostic tool of claim 5, wherein the user interface includes a read button that also acts as a first scroll button and a back button that also acts as a second scroll button.

7. The diagnostic tool of claim 1, wherein the user interface includes a read button that also acts as a first scroll button and a back button that also acts as a second scroll button.

8. A method of indicating an urgency repair level of a vehicle, comprising:

connecting a diagnostic tool to a data link connector in the vehicle, wherein the diagnostic tool includes an indicator that indicates a level of urgency related to a condition of the vehicle based on a stored diagnostic trouble code (DTC);

powering on the vehicle in order to retrieve diagnostic trouble code (DTC);

retrieving the DTC and the level of urgency from a database stored in a vehicle diagnostic computer wherein the level of urgency is determined from a pool of information related to vehicle service;

displaying on a display a summary of the DTC retrieved;

indicating with an indicator the level of urgency of repairs for each DTC retrieved, wherein the level of urgency takes the form of multiple levels of urgency and the indicator displayed is distinct for each of the multiple levels of urgency and corresponds only with that level of urgency; and indicating with words a suggested action based on the DTC.

9. The method of claim 8, wherein the level of urgency includes three levels of urgency ranging from attention, caution and urgent repair needed.

10. The method of claim 8, wherein retrieving the DTC is automatic when the diagnostic tool is connected to the vehicle and the vehicle is powered on.

11. The method of claim 8, wherein when the retrieving step fails, the diagnostic tool will toggle between a first message and a second message on the display.

12. The method of claim 8, wherein the indicating step further comprises displaying the corresponding DTC with the urgency indicator.

13. The method of claim 12, wherein each DTC will have its own corresponding urgency indicator.

14. The method of claim 8 further comprising pressing a read button in order to scroll in a first direction and pressing a back button in order to scroll in a second direction.

15. A diagnostic tool for diagnosing a vehicle, comprising:

means for processing configured to process a diagnostic data from the vehicle;

memory means configured to store a database that is used to indicate a condition of the vehicle wherein the database includes a stored diagnostic trouble code (DTC) and a level of urgency corresponding to said stored DTC, which indicates the severity of the DTC, wherein the corresponding level of urgency is determined from a pool of information related to vehicle service;

means for connecting configured to connect the diagnostic tool to a data link connector in the vehicle, wherein the means for connecting connects removably at a first end to the data link connector and connects non-removably at a second end to the diagnostic tool;

means for interfacing configured to allow a user to interact with the diagnostic tool;

means for translating configured to that allow the diagnostic tool to communicate with the vehicle in at least one communication protocol;

means for displaying configured to display an indicator that indicates the level of urgency related to the DTC wherein the level of urgency takes the form of multiple levels of urgency and the means for displaying displays a distinct indicator for each of the multiple levels of urgency and corresponds only with that level of urgency and wherein the means for displaying also displays words to indicate an action based on the DTC; and means for housing surrounding the means for processing, the memory means, the means for connecting, the means for interfacing, the means for translating, and the means for displaying.

16. The diagnostic tool of claim 15, wherein the level of urgency of the condition of the vehicle informs the user when the vehicle should be serviced based on the stored DTC.

17. The diagnostic tool of claim 16 wherein the level of urgency includes three levels of urgency ranging from a low level, a middle level and a highest level of urgency as to when the user should bring his vehicle in for repairs.

18. The diagnostic tool of claim 16, wherein the levels include three levels of urgency ranging from a low level, a middle level and a highest level of urgency to indicate to the user if the vehicle can still be driven without potential damage to the vehicle.

19. The diagnostic tool of claim 15, wherein the level of urgency includes three levels of urgency ranging from attention, caution and urgent repair needed.

20. The diagnostic tool of claim 19, wherein the means for interfacing includes a read button that also acts as a first scroll button and a back button that also acts as a second scroll button.

* * * * *